United States Patent
Lubbers et al.

(10) Patent No.: US 7,886,298 B2
(45) Date of Patent: Feb. 8, 2011

(54) DATA TRANSFER PROTOCOL FOR DATA REPLICATION BETWEEN MULTIPLE PAIRS OF STORAGE CONTROLLERS ON A SAN FABRIC

(75) Inventors: Clark Lubbers, Colorado Springs, CO (US); Susan Elkington, Colorado Springs, CO (US); Randy Hess, Colorado Springs, CO (US); Stephen J. Sicola, Palmer Lake, CO (US); James McCarty, Colorado Springs, CO (US); Anuja Korgaonkar, Colorado Springs, CO (US); Jason Leveille, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2588 days.

(21) Appl. No.: 10/106,903

(22) Filed: Mar. 26, 2002

(65) Prior Publication Data

US 2003/0188035 A1 Oct. 2, 2003

(51) Int. Cl.
*G06F 9/46* (2006.01)
*G06F 15/173* (2006.01)
*G06F 3/00* (2006.01)

(52) U.S. Cl. ...................... 718/104; 718/101; 709/226; 710/52; 710/56

(58) Field of Classification Search ............... 710/74, 710/1, 52, 56; 714/6–7, 1; 711/148; 709/235, 709/216, 203, 208, 226, 223, 227; 718/104, 718/101; 370/225–228, 235
See application file for complete search history.

(56) References Cited

U.S. PATENT DOCUMENTS

| | | | |
|---|---|---|---|
| 5,367,517 A | * | 11/1994 | Cidon et al. ............. 370/431 |
| 5,533,190 A | | 7/1996 | Binford et al. |
| 5,604,866 A | * | 2/1997 | Kolb et al. ............. 709/235 |
| 5,721,918 A | | 2/1998 | Nilsson et al. |
| 5,799,306 A | * | 8/1998 | Sun et al. ............. 707/10 |
| 5,893,155 A | | 4/1999 | Cheriton |

(Continued)

OTHER PUBLICATIONS

Elkington, Susan, Enterprise Project, Data Replication Manager Functional Specification for VCS V3 Release, Compaq Computer Corporation, Nov. 30, 3001, pp. 1-68.

(Continued)

*Primary Examiner*—Qing Wu

(57) ABSTRACT

A system for communicating between two devices in a network in which a semi-persistent tunnel is established between the two devices in advance of data communication. The semi-persistent tunnel includes resources that are pre-allocated in a first device at a first end of the communication link by a second device at the second end of the communication link. The first and second devices implement a plurality of processes for handling data transfer operations. Preferably, the semi-persistent tunnel also includes resources that are pre-allocated in a device at the second end of the communication link by the device at the first end of the communication link to allow bi-directional communication. Data transfer operations transmitted through the tunnel include an identification of specific resources of the pre-allocated resources that are to handle the data transfer operation. Data transfer operations also include a vector identifying a particular process among the plurality of processes that implement the data transfer operation.

2 Claims, 6 Drawing Sheets

U.S. PATENT DOCUMENTS

| | | | |
|---|---|---|---|
| 6,041,423 | A | 3/2000 | Tsukerman |
| 6,148,368 | A | 11/2000 | DeKoning |
| 6,185,663 | B1 | 2/2001 | Burke |
| 6,275,783 | B1 | 8/2001 | Okamura |
| 6,542,962 | B2 * | 4/2003 | Kodama et al. ............. 711/114 |
| 6,594,698 | B1 * | 7/2003 | Chow et al. ................. 709/226 |
| 6,606,690 | B2 * | 8/2003 | Padovano ................... 711/148 |
| 6,640,245 | B1 * | 10/2003 | Shen et al. .................. 709/216 |
| 6,654,830 | B1 * | 11/2003 | Taylor et al. .................. 710/74 |
| 6,658,590 | B1 * | 12/2003 | Sicola et al. ................... 714/6 |
| 6,725,297 | B1 * | 4/2004 | Askar et al. .................. 710/52 |
| 6,862,606 | B1 * | 3/2005 | Major et al. ................ 709/203 |

OTHER PUBLICATIONS

Hess, Randy and Korgaonkar, Anuja, Enterprise Project, DRM Logging, Compaq Computer Corporation, Nov. 25, 2001, pp. 1-12.

Hoffman, Brian, Enterprise Software Functional Specification V0.10, Compaq Computer Corporation, Jul. 25, 2001, pp. 1-26.

Multi-Directional Architectural Design, pp. 1-3.

Features and Benefits of HSG80 ACS 8.6P Data Replication Manager, COMPAQ White Paper, Oct. 2001, Enterprise Storage Group, Compaq Computer Corporation, pp. 1-15.

Storage Virtualization and the *StorageWorks* Enterprise Virtual Array, COMPAQ White Paper, Sep. 2001, Enterprise Storage Array Division Marketing, Compaq Computer Corporation, pp. 1-13.

SCSI-2 Spec—Logical characteristics, http://www.uni-mainz.de/~koenig/scsi/SCSI2-06.html, Mar. 8, 2002, pp. 3-31.

Understanding Replication in Databases and Distributed Systems, Jul. 13, 1997, Computer Based Learning Unit, University of Leeds, pp. 1-26.

ENSA-2 *VersaStor* Virtualization Technology, Enterprise Storage Group, *Storage Works* by COMPAQ White Paper, Dec. 2001, Compaq Computer Corporation, pp. 1-10.

NCITS T10, Project 1144D, Revision 07a, Nov. 1, 2001, pp. 8-26.

StorageWorks by Compaq Enterprise Virtual Array, QuickSpecs, World Wide- version 5, Feb. 27, 2002, pp. 1-12.

T10/98-203 revision 0, Persistent Reservations, Jul. 7, 1998, pp. 1-20.

iSCSI: ISID and the New Persistent Reservations Proposals, http://www.pdl.cmu.edu/mailinglists/ips/mail/msg07055.html, Mar. 19, 2002, pp. 1-4.

Software Product Description, Compaq SANworks Virtual RepIIcator-Version 2.0, SPD: 70.41.02, Jun. 5, 2000, pp. 1-5, Compaq Computer Corporation.

Features and Benefits of HSG80 ACS 8.6P Data Replication Manager, Oct. 2001, pp. 1-22, Compaq White Paper, Enterprise Storage Group, Compaq Computer Corporation.

Information Systems—dpANS Fibre Channel Protocol for SCSI, revision 012, Dec. 4, 1995, pp. i-63, American National Standard-draft.

Information Technology- Fibre Channel Protocol for SCSI, second version (FCP-2), Nov. 1, 2001, pp. ii-133, American National Standard-draft.

* cited by examiner

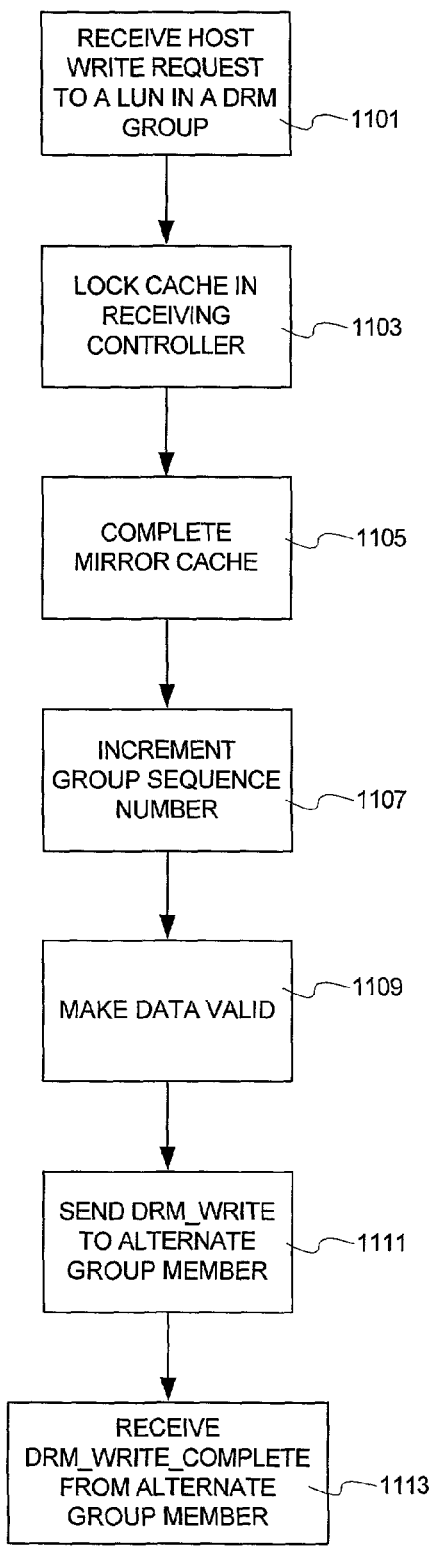
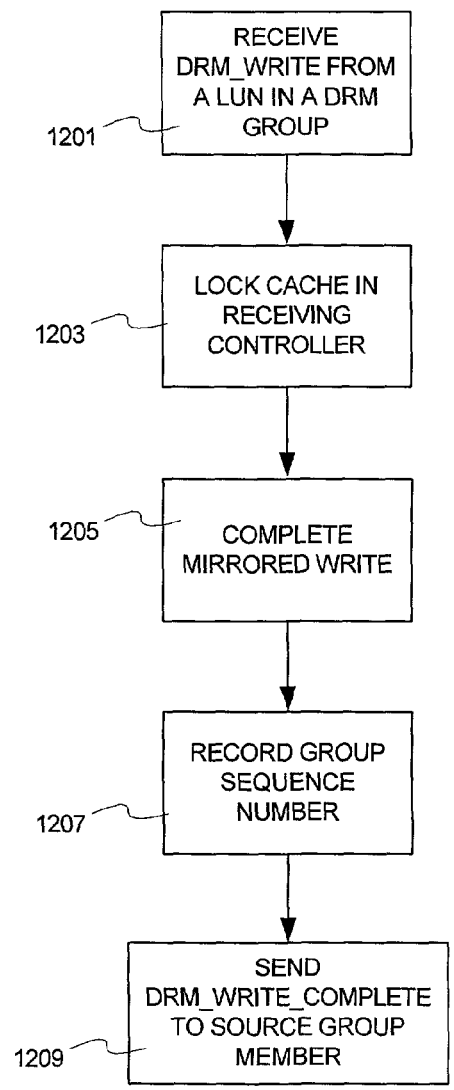
FIG. 11
FIG. 10

DATA TRANSFER PROTOCOL FOR DATA REPLICATION BETWEEN MULTIPLE PAIRS OF STORAGE CONTROLLERS ON A SAN FABRIC

BACKGROUND OF THE INVENTION

1. Field of the Invention

The present invention relates, in general, to efficient transmission of data including control information between devices across a network, and, more specifically, to a data transfer protocol useful in data replication that enables storage controllers linked via networks such as a storage area network (SAN) to work in a "tightly coupled" fashion with extremely high efficiency.

2. Relevant Background

Recent years have seen a proliferation of computers and storage subsystems. Demand for storage capacity grows by over seventy-five percent each year. Early computer systems relied heavily on direct-attached storage (DAS) consisting of one or more disk drives coupled to a system bus. More recently, network-attached storage (NAS) and storage area network (SAN) technology are used to provide storage with greater capacity, higher reliability, and higher availability. The present invention is directed primarily SAN systems that are designed to provide shared data storage that is beyond the ability of a single host computer to efficiently manage.

Mass data storage systems are implemented in networks or fabrics that provide means for communicating data between systems that use data, and the storage systems that implement the physical storage. In many cases, host computers act as storage servers and are coupled to the network and configured with several disk drives that cumulatively provide more storage capacity or different storage functions (e.g., data protection) than could be implemented by a DAS system. For example, a server dedicated to data storage can provide various degrees of redundancy and mirroring to improve access performance, availability and reliability of stored data. Collecting storage sub-systems, where a separate server manages each sub-system, can form a large storage system. More recently, virtualized storage systems such as the Storage-Works® Enterprise Virtual Array announced by Compaq Corporation in October, 2001 provide storage controllers within a fabric or network that present virtualized storage to hosts that require data storage in a manner that enables the host to be uninvolved in the physical configuration, allocation and management of the storage devices. StorageWorks is a registered trademark of Compaq Computer Corporation in the United States and is a trademark or registered trademark in other countries. In this system, hosts simply access logical units of storage that appear to the host as a range of logical address space.

SAN systems enable the possibility of storing multiple copies or "replicas" of data at various physical locations throughout the system. Data replication across multiple sites is desirable for a variety of reasons. To provide disaster tolerance, copies of data stored at different physical locations is desired. When one copy becomes unavailable due to equipment failure, a local network outage, natural disaster or the like, a replica located at an alternate site can allow access to the data. Replicated data can also theoretically improve access in normal operation in that replicas can be accessed in parallel, avoiding bottlenecks associated with accessing a single copy of data from multiple systems.

In SAN systems, the storage controllers at various sites communicate with each other using a common data transfer protocol to coordinate storage and management activities at various sites. The data transfer protocol is key to maintain performance as well as proper ordering in a multi-volume, multi-target replication environment. Typically it is difficult for a protocol to provide either performance or guaranteed ordering, but in replication applications both are required.

The most popular protocol in SANs is the small computer systems interface (SCSI) protocol family. SCSI is well established as an efficient protocol for block data transfers between host computers and storage devices. To extend the range of SCSI, fibre channel is used in SANs to provide a high-speed, long-distance data communication mechanism. Because fibre channel standards accept SCSI as a transport layer protocol, SCSI is the protocol of choice in most SAN implementations. In data replication systems, however, SCSI contains several inefficiencies that impact performance in communication between storage controllers in a SAN. While fibre channel defines several other transport protocols that substitute for SCSI, in general these other protocols share the limitations of SCSI.

Older methods, for example SCSI, were slower due to the inherent attempt to have the initiator control all data flow. Data flow control involves implementing the data structures and processes that execute, for example, write and copy operations to remote locations while ensuring that the order in which operations are executed retain data integrity, as well as detecting and responding to error conditions. This centralization in a single controller creates a bottleneck in that the initiator storage controller performs the lion's share of data replication tasks while resources in a target controller were underutilized. For example, the target is not involved in the processes of ordering and command completion, forcing the initiator to send all the data to the target and manage the ordering and command completion operation.

SCSI over Fibre channel uses a command/response message protocol to send packets or frames of information between a device associated with a source identifier (S_ID) and a device associated with a destination identifier (D_ID). More specifically, a write operation in a SCSI protocol includes a command phase and a data phase. The command phase establishes an "exchange" which defines specific buffers in the transmitting and receiving devices for storing communicated data frames. A SCSI write cycle begins by a first device sending a command information unit (IU) from the originating device to the responding device in the command phase, which identifies an originator exchange identification (OX_ID) pointing to the buffer on the originating device that is dedicated to the write operation. Various metadata about the write operation is included in the command IU is used to set up corresponding buffers in the responding device. These corresponding buffers are assigned a responder exchange identification (RX_ID) which is transmitted back to the originating device in a response IU. Only after both devices know the OX_ID/RX_ID pair that defines the exchange can the devices can send the actual data that is subject of the operation in the data phase. Once all the data has been transmitted, the responding device sends a response message indicating status of the write operation.

This exchange, therefore, includes at least three overhead frames in addition to the actual data frames in order to complete the transaction. Because an exchange is set up and broken down frequently, these overhead costs are incurred frequently. Significantly, two of these overhead frames must be exchanged before any data can be transferred. In a network with high latency, this delay caused by the initial set-up of the exchange not only increases the latency required to perform each operation, but also increases the resources required (e.g., buffer memory) to hold data before transmission.

SCSI over Fibre channel standards include mechanisms for ensuring in-order delivery of packets such that when each packet is transmitted, and the recipient device will generate an acknowledge message for each command that is successfully performed. For example, a command message may contain a write command, various header information indicating the source and destination of the write command, metadata and state information, and data to be written in a payload section. A storage node that is the designated destination will perform the write and send an acknowledge message addressed to the source ID of the command message.

The fibre channel protocol works well in applications where a single stream of data is involved such that each frame can contain a large amount of data. In such applications, the overhead associated with sending acknowledge packets for each frame is tolerable. However, in a data replication application a channel between two devices may carry multiple streams. In such cases, the overhead associated with the acknowledge packet sent for each transmitted frame is significant and the protocol becomes inefficient.

In any data communication protocol, the ability to detect and react to unsuccessful transmission (e.g., lost frames) is important. SCSI is relatively slow to detect some kinds of lost information. SCSI was particularly designed to operate over a data bus, not a network, and so is better suited for small, predictable latency in the communication channel. In a SAN, however, the latency may be long and somewhat variable, making it difficult for SCSI to detect when a frame has not been delivered.

A data replication protocol must also respond to connection or link failures in a manner that preserves the integrity of the operations being communicated, and quickly adapts to the failure to perform the desired transaction. For example, when a link fails before a write or copy transaction has been committed to an alternate site, the SCSI protocol cannot readily transfer the transaction to another communication link. Instead, a failure condition is reported and the transaction must be repeated once a new connection is established. A need exists for a system that enables data transactions to be re-routed in-flight in response to link/connection failure conditions.

Link congestion is a condition similar to link failure described above. An operable link that is carrying too much traffic will increase the latency required to deliver frames and increases the likelihood that frames will be dropped. Increased latency also increases the demands on processor and memory resources required to perform the operations as, for example, more and larger buffers are required to hold the larger number of in-flight transactions. A need exists for a system that enables data transactions to be re-routed in-flight in response to link/connection congestion.

SUMMARY OF THE INVENTION

Briefly stated, the present invention is directed to a protocol for communicating between two devices in a network in which a semi-persistent tunnel is established between the two devices in advance of data communication. The semi-persistent tunnel includes resource sets called "bundles" that are allocated at one end but managed by the other end. Each "bundle" is an array of identical resources that can be individually identified simply by its array index. In some cases, processing of data in array order may imply the sequencing of information. Every tunnel requires one bundle of data buffers dedicated to receiving command or response information at each end.

Although a primitive unidirectional tunnel could be implemented wherein commands from one end are only ACK-knowledged by the other end, in practice more sophisticated responses are required so that tunnels are inherently bi-directional at the command-response level. Within the SCSI Fiber Channel protocol, data frames are directed to a FC-address and labeled with a "Transaction ID" (OX_ID or RX_ID). The receiving device uses the OX_ID or RX_ID to identify the relationship of the data to a particular transaction. In some cases, hardware may use the OX_ID to determine a particular memory address on the device in which to place the data.

Devices that implement the protocol identify specific ranges or sub-ranges of OX_IDs with specific resources. A single ordinal specifies the full range of OX_IDs used by a specific tunnel at a particular end, both ends using a given OX_ID to specify the resource at that the one end. One fixed sub-range defines the buffers to receive commands from the other end. The corresponding resources are allocated for an "open" tunnel. Other resources are allocated at a specific end as needed to transfer significant amounts of data from the other end. The first and second devices implement a plurality of processes for handling data transfer operations.

Data transfer operations transmitted through the tunnel include an identification of specific resources of the pre-allocated resources ("bundles") that are to handle the data transfer operation. Commands and responses are implemented as "Message Function Calls" (MFCs). Only the first four bytes of a generic message (MFC) have a fixed format. One byte is reserved for an index (or function code) to indicate how the message is to be processed. A vector of call addresses is referenced via the index to find a message routine to call. Another byte contains flags that are processed in a routine dependent manner. Two bytes contain the size of the entire message including the first four bytes. The maximum message is 2000 bytes in a particular implementation.

The Acknowledge received for a message indicates that the routine has been invoked on the controller to which it was sent. In many cases, this is sufficient because certain behavior can be assumed based on the execution of the routine. Note that no status about the completion state of the invoked routine need be expressed or implied by the Acknowledge. It is akin to calling a subroutine that returns no value and operates on a single data structure consisting of the message itself. This data structure exists only during the duration of the function call. An important feature of this protocol is that acknowledgment of successful reception of data related to a specific resource by one end implies that the particular resource (as identified by a specific OX_ID) is again available for use by the other end. This enables self-renewing behavior by rearming the resource for a subsequent data transfer operation.

BRIEF DESCRIPTION OF THE DRAWINGS

FIG. 10 and FIG. 11 illustrate in flow-diagram form actions performed to execute replicated write operations in accordance with the present invention.

DETAILED DESCRIPTION OF THE PREFERRED EMBODIMENTS

Figure 1:
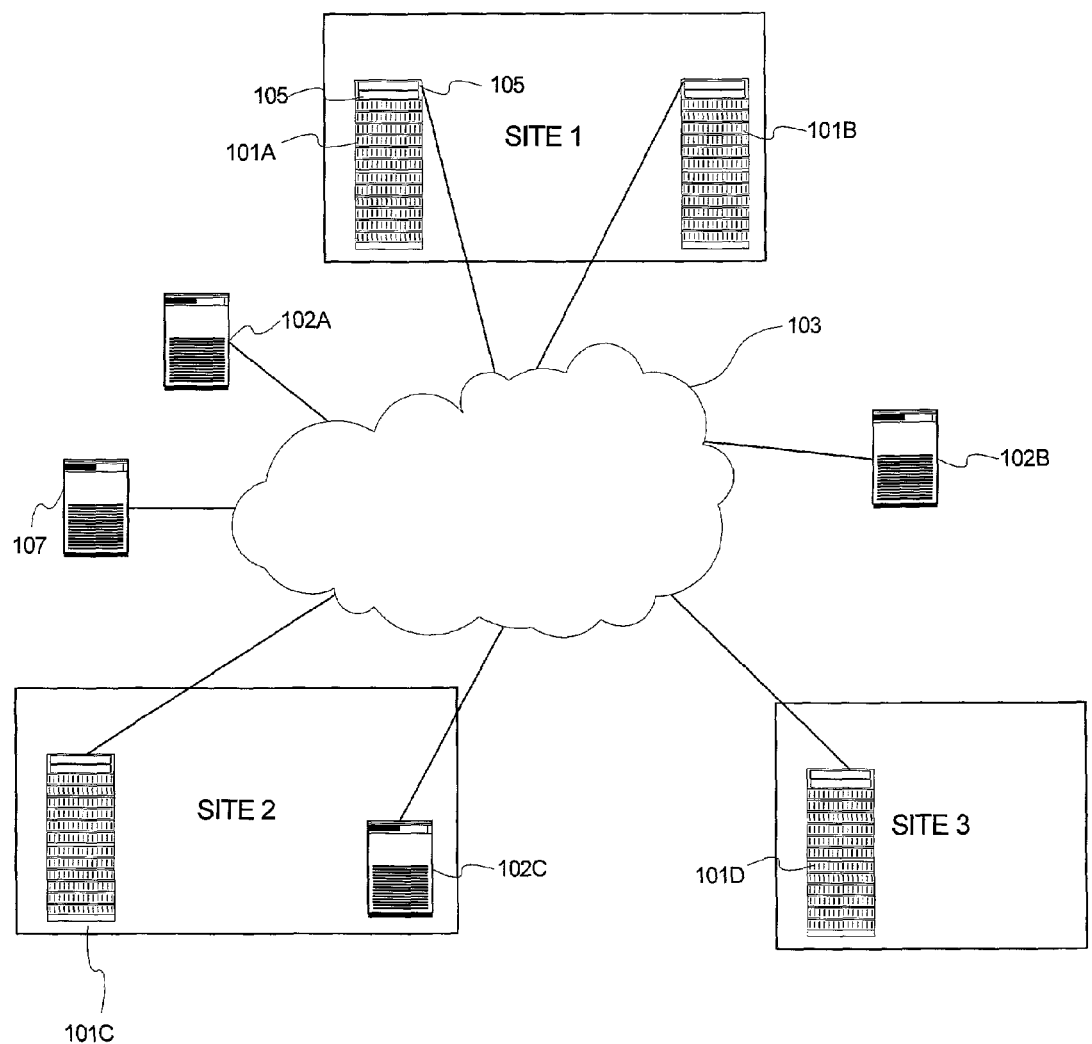
FIG. 1 shows a storage area network (SAN) environment in which the present invention is implemented.

The present invention involves a data replication system which engages all controllers that are participating in a data replication operation (e.g., both source and destination) in the process of ordering and command completion, which enables the source to send the data to the destination as quickly as possible. The system in accordance with the present invention involves a data transport protocol designed to optimize data replication operations, both in terms of speed and ensuring in-order delivery, between two or more storage controllers in a SAN environment. However, it is apparent that the protocol of the present invention has broader utility in any data transfer application where semi-persistent or persistent tunnels are useful to transfer data between locations efficiently.

One significant advantage of the protocol in accordance with the present invention is that a data transfer requires only one round trip between sending and receiving devices. That is a significant performance benefit, and is critical with round the world distance latencies. The SCSI over fibre channel protocol used in the past requires two round trips for every transfer.

The present invention is specifically described in terms of a protocol layer implemented on top of or within a standard communication protocol such as fibre channel. However, other transmission protocols may be used instead of fibre channel. The particular examples illustrate the invention in terms of a storage area network (SAN) comprising dual controllers attached over a redundant fibre channel fabric, with at least one other pair of controllers on the same fabric, over which data is replicated for multiple volumes simultaneously, in multiple directions, and with various degrees of synchronicity. However, the specific implementation may be varied significantly while achieving some or all of the benefits of the present invention.

The fibre channel structure is defined as a five-layer stack of protocols, where the five layers define the physical media and transmission rates, encoding scheme, framing protocol and flow control, common services, and the upper level application interfaces. FC-0, the lowest layer, specifies physical characteristics of the media, transmitters, receivers and connectors. FC-1 defines the 8B/10B encoding/decoding scheme used to integrate the data with the clock information required by serial transmission techniques. FC-2 defines the framing protocol for data transferred between ports as well as the mechanisms for using Fibre Channel's circuit and packet switched service classes and the means of managing the sequence of a data transfer. FC-2 is often referred to as the "link level". FC-3 is undefined and currently is not used. FC-4 provides integration of FC-2 level frames with existing standards and protocols such as FDDI, HIPPI, IPI-3, SCSI, Internet Protocol (IP), Single Byte Command Code Set (SBCCS), and the like.

The present invention includes a protocol implemented essentially as a substitute for the more commonly used SCSI at the application level in SAN systems. SCSI is widely used in storage systems because it is generally efficient in block data transfers, but when implemented over fibre channel in SAN systems includes several inefficiencies. The protocol in accordance with the present invention is optimized to provide both low overhead transfer of data between multiple controllers connected by a fibre channel fabric, but also to provide mechanisms for ensuring in-order delivery of write operations and recovering from link failures and link congestion.

The system in accordance with the present invention creates a communication tunnel through a fibre channel fabric that is defined by communication resources (e.g., buffers) allocated within devices (e.g., storage controllers) on either side of the tunnel. The communication resources are "pre-armed" before a specific data transaction begins so that when a data transaction is initiated, the latency associated with allocating communication resources is not incurred. The communication resources are self-renewing in that upon completion of a particular data transaction, the communication resources are re-armed such that they are ready to immediately handle a subsequent data transaction.

The system in accordance with the present invention quickly detects lost frames and operations. This is very important in a SAN environment where timeouts may be long and switch delays larger than what is typical in smaller storage environments. The system also has the ability to acknowledge the receipt of several data frames using just one frame. This dramatically cuts down on fibre Channel frame traffic, which can help ease switch and controller congestion. This protocol also enables the capability to quickly transfer data from a tunnel that has lost a connection, to an alternate path using another tunnel. This allows a connection failover to occur much faster than previous implementations. This protocol also has the ability to detect frame congestion, both on the destination controller and the link to the destination controller. This feature, coupled with an ability to fail over quickly from one controller to another, allows the system in accordance with the present invention to re-route in-flight data to a tunnel (i.e., a communication channel through the fibre channel fabric) which is less congested. This ultimately allows commands to complete faster than prior data replication implementations.

Another feature of the protocol in accordance with the present invention is that each protocol message can contains not only an address of a machine or object that will receive the message, but also a vector or pointer to a function within the recipient that will be used to process the protocol message. Using this mechanism allows the system to be extended easily. New functionality can be added by defining new messages that point to specific new functions. In this manner, the new functions can be added without affecting existing code.

FIG. 1 illustrates a multi-site storage area network (SAN) implementing features in accordance with present invention. In particular, the present invention relates to a protocol, including data structures and processes used to implement the protocol that enables communication between site 1, site 2, and site 3 for data replication operations. The example shown in FIG. 1 includes only three sites (Site 1, Site 2 and Site 3) to ease illustration and understanding. However, it should be understood that any number of sites might be provided to meet the needs of a particular application. The various sites may be physically proximate, or separated by an arbitrary distance. A particular implementation may well limit the number of possible sites, and may well limit the maximum or minimum physical separation of sites. Each site includes one or more storage cells 101, such as cells 101A, 101B, 101C and 101D. Any number of storage cells 101 may be included in any site, although the number implemented in any particular application may be constrained to meet the needs of that application.

The storage implemented at various sites is accessed by host computer 102, such as host computers 102A, 102B and 102C. Host computers are generally machines that consume or require data storage. Typical host computers 102 demand large quantities of storage such as mainframes, web servers, transaction processors, and the like. However, a host computer 102 may comprise a computer of any processing capacity that requires or benefits from network storage either to reduce cost of the host 102, implement more storage capacity than practical in a host 102, share data amongst multiple hosts 102, or the like. A host computer 102 may couple to the storage cells 101 via a connection to network 103 such as illustrated by host computers 102A and 102B. In many cases, a host computer 102 will be located in a site such as host computer 102C located in site 2. The topological location of host computers 102 is a matter of design choice selected to meet the needs of the particular application. In many cases, one or more host computers 102 will be located at a site. It should be appreciated, however, that host computers 102 have little to do with the management and configuration of the DRM system of the present invention, other than the reality that as consumers of data, the DRM system is preferably able to satisfy storage needs of host computers 102 at various physical and topological locations.

Storage cells 101 and hosts 102 couple to data communication network 103 and communicate with each other using the data transfer protocol in accordance with the present invention. Storage cells 101 implement a quantity of data storage capacity that is accessible through storage controllers 105 that implement one or more connections to network 101. Storage cells 101 typically implement hundreds of gigabytes to terabytes of physical storage capacity. In a particular implementation, controllers 105 virtualize the physical storage capacity such that it is configurable into logical units (LUNs) of storage capacity. The LUNs implement an arbitrary quantity of logical address block storage, where each LUN has a specified level of data protection such as RAID 0-5 data protection. Hosts 102 access physical storage capacity by addressing read and write operations to specified LUNs, and can be otherwise unaware of the physical storage architecture or data protection strategy for a particular LUN that is being accessed. Storage controllers 105 manage the tasks of allocating physical storage capacity to specified LUNs, monitoring and maintaining integrity of the LUNs, moving data between physical storage devices, resizing LUNs, and other functions that maintain integrity and availability of the data stored therein.

Network 103 comprises any of a variety of available networks, and may comprise a plurality of interconnected networks. In particular examples, network 103 comprises at least two independent fibre channel fabrics to provide redundancy. These fibre channel fabrics may comprise long-distance connection mechanism such as asynchronous transfer mode (ATM) and Internet protocol (IP) connections that enable sites to be separated by arbitrary distances.

At least one SAN management appliance (SMA) 107 is coupled to network 103 to enable connections to storage cells 101. In practice, a number of SMAs 107 are provided, and typically an SMA 107 is located at each site to provide management operation for the storage cells 101 at that site. However, because each SMA 107 communicates through network 103, the physical location of SMAs 107 is arbitrary. SMAs 107 are preferably implemented at topological locations that provide redundant connections to the storage cells 101.

Network 103 is accessible directly or indirectly to all components at Site 1, Site 2, and Site 3 including hosts 102 and controllers 105. In preferred implementations, each component has redundant links to network 103, and network 103 is preferably implemented as having redundant sub-networks. Redundancy provides connectivity in event of failure or degradation of some portions of network 103 (i.e., a link failure or connection failure). Redundancy also enables connectivity in event of failure or degradation of controllers 105 and/or interface components of hosts 102.

In the system of FIG. 1, it is important to realize that storage cell 101 is able to function as a primary storage location for any of hosts 102, and at the same time function as a secondary or alternative storage location for a replica of data from another storage cell 101. This feature is referred to as "bi-directionality". Accordingly, each controller 105 is preferably enabled to generate and respond to the full set of commands defined by the data transfer protocol of the present invention as any storage cell 101 may be the source for a data replication group and so generate protocol messages that initiate creation of group members in other storage cells 101 and initiate write and copy operations to replicate data. Similarly, each storage cell 101 may be a destination or alternate site for a data replication group, and so respond to protocol commands from other storage cells to create data replication groups and member LUNs as well as to respond to write and copy commands to store replicated data from other storage cells 101. The protocol in accordance with the present invention is peer cooperative in that the behaviors required to complete a particular operation are managed in distributed fashion by all storage cells 101 participating in the operation.

Figure 2:
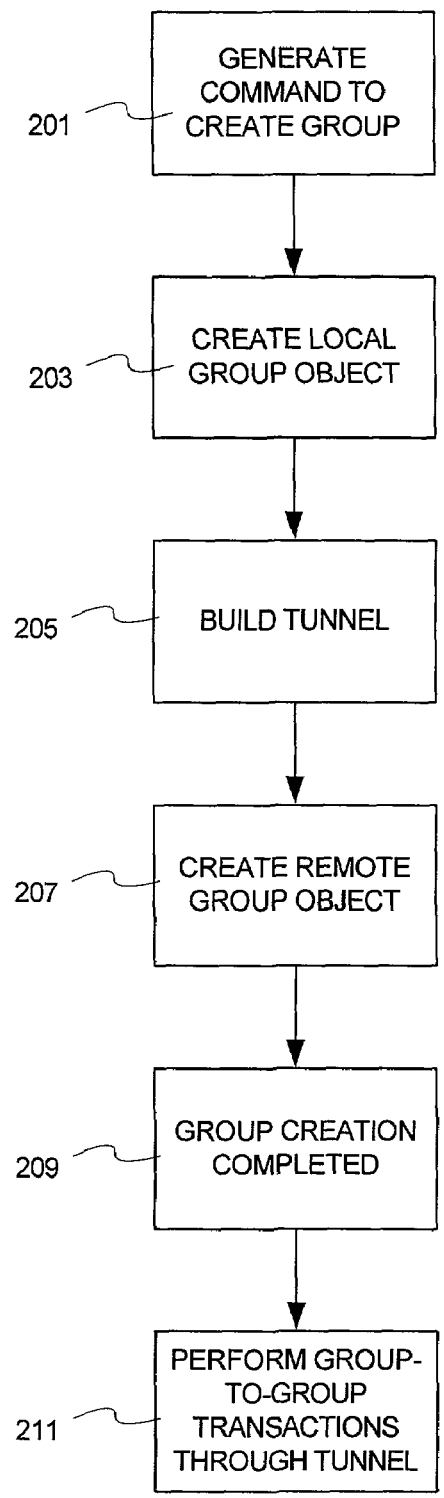
FIG. 2 illustrates in flow diagram form basic operations in accordance with the present invention.

FIG. 2 illustrates in flow-diagram form an overview of operations implemented by the data transfer protocol in accordance with the present invention used to establish a data replication group. Prior to formation of a data replication group a source LUN is established one site. That source LUN may be used for operational data transactions in a non-replicated fashion prior to establishing a data replication group. Alternatively, the source LUN may remain unused until the data replication group is formed. The designation of the initial LUN as a "source" has little meaning until a data replication group is formed, however, that terminology is used herein for consistency and ease of understanding.

At operation 201, a host, such as SMA 107, generates a command to create a data replication group. The host command identifies the previously created source LUN, and identifies one or more storage cells 101 that will be used for alternate sites for destination LUNs. The host command is directed to a specific controller 105 that is currently managing the previously created source LUN. At this point, destination LUNs do not exist at the alternate sites as they are created specifically to meet the requirements of the data replication group. In operation 203, the controller that receives the host command creates a local group object (e.g., object 505 in FIG. 5), which is a logical entity that represents the group in that controller. The group object 505 includes various methods to implement the data replication group behaviors, including the data transfer protocol of the present invention. Once created, the local group object 505 contains the source LUN.

In operation 205, a communication link called a tunnel is created. The tunnel is a communication link through fabric 103 that is used only by group members to communicate data replication management and data transfer operations related to that group. A tunnel is similar to an "exchange" used in the SCSI over fibre channel protocol However, unlike a conventional exchange that is set up and taken down for each SCSI operation, the tunnel is self-renewing so that it persists over several operations. A physical link or path in fabric 103 may implement any number of tunnels to support data replication groups 505. Typically only one tunnel exists between any source/destination pair of controllers, however, a tunnel can be formed in any available path that couples a source/destination pair of controllers 105.

Once a tunnel is created, the initial source controller sends a protocol message through the tunnel to the destination controller in operation 207 to cause the destination controller to create a remote group object. The remote group object is remote with respect to the initial source controller, but is, of course, local to the destination controller, as the designations of "remote and local" are determined from a particular perspective. Hence, the remote group object is substantially similar in construction and behavior as the local group object. The destination controller 105 generates a protocol message directed to the initial source controller 105 to indicate successful creation of the remote group object is successfully created in operation 209. At this point, a data replication group is formed and subsequent data operations in 211 to either member will result in replicated operations to the other member.

Several operations must be performed subsequent to formation of a remote group object to fully implement the data replication system at the remote site. For example, the source site will communicate information about the source LUN (such as its logical block capacity), and may communicate other information such as a desired data protection scheme for the destination LUN. Using this information, the remote group object can initiate the creation of a destination LUN that is suitable for replicating the source LUN.

Figure 3:
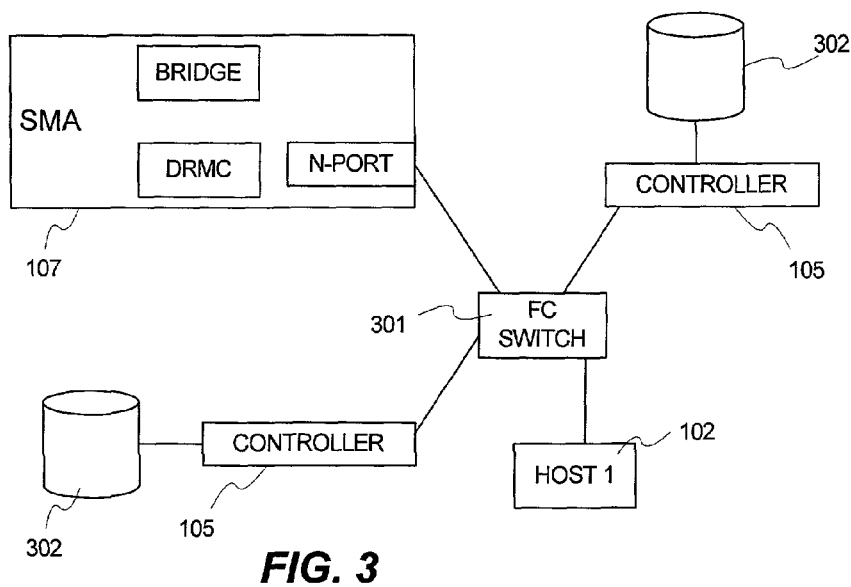
FIG. 3 illustrates a basic implementation of the present invention.

FIG. 3 illustrates various features of the present invention embodied in a basic configuration. In the particular implementation, storage management appliances (SMAs) 107 include a bridge and a data replication management console (DRMC) which are cooperative software processes that each present a user interface for configuration and monitoring of DRM processes. The Bridge functions as an element manager for controllers 105, and handles basic functions of connecting to the communication network 103, issuing commands to controllers 105, and implementing security policies. All customer configuration and monitoring of DRM activities goes through the bridge. The DRMC provides increased functionality over the bridge interface, by managing solely DRM storage and providing assists, such as with site recovery.

Physical storage devices 302 are coupled to controllers 105 by a high-speed redundant connection such as fibre channel arbitrated loop (FCAL) connections. An FCAL connection allows each of tens or hundreds of individual hard disk drives to be accessed not only at high speed, but also by more than one controller 105 in a storage cell. Further, by providing redundant FCALs, one FCAL can fail while each storage device 302 remains accessible by either controller. The present invention is largely independent of the specific implementation of physical storage devices 302, and it is contemplated that other physical storage architectures will provide suitable equivalents for purposes of the present invention.

Hence, although FIG. 3 shows only a single controller 105, it is contemplated that each storage cell is preferably configured with more than one controller 105 in a redundant fashion. Further, by providing redundant FCALs, one FCAL can fail while each storage device 302 remains accessible by either controller 105. Because ports of controllers 105 are configured to handle both operational data transactions and DRM traffic, a single port connection between each controller 105 and switch 301 is all that is necessary to implement data replication features of the present invention. However, the basic configuration shown in FIG. 3 sacrifices much redundancy, and would not be recommended for most applications, but is presented here to ease understanding of the present invention. It is important to understand that a great deal of flexibility exists in configuring the present invention for specific applications. Redundant connections and components can be added and removed flexibly to meet the needs of a particular application.

Figure 4:
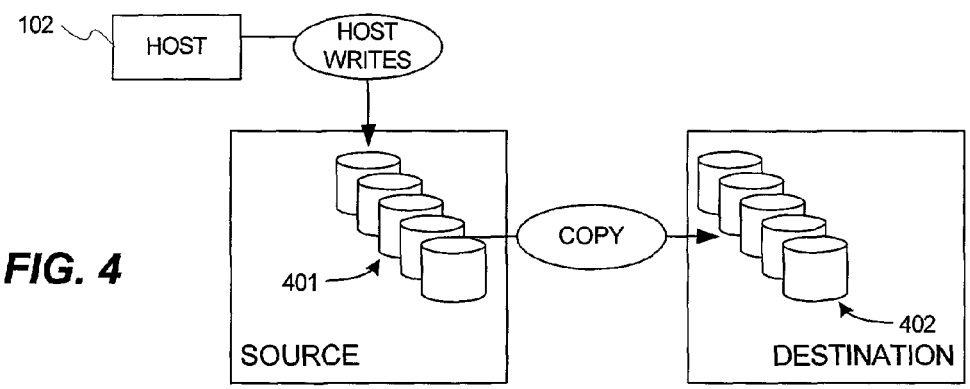
FIG. 4 shows data flow relationships in a data replication management operation in accordance with the present invention.

FIG. 4 shows hierarchical relationships defined in accordance with the present invention to model data replication management. Prior to performing DRM operations, a storage cell 101 is implemented at each site, and a virtual disk or LUN 401 is allocated within a storage cell 101 that is handing operational data with one or more hosts 102. For any particular copy set, one virtual disk 401 is designated as a source, although it should be understood that a source virtual disk 401 might be allocated at any site implementing the DRM features of the present invention. Virtual disk 401 may comprise a plurality of physical storage resources that span multiple physical drives within the storage cell 101, and may implement any desired capacity and data protection type.

A destination virtual disk 402 is allocated within a storage cell 101 at a designated alternative or destination site. In normal operation, write operations are directed to source virtual disk 401, and copied in a background process to one or more destination virtual disks 402. Destination virtual disk 402 has the same logical storage capacity as the source virtual disk, but may provide a different data protection configuration. In other words, destination disk 402 shares all of the dependent attributes of source virtual disk 401, but is not required to share any of the independent attributes of virtual disk 401. Controllers 105 of the destination storage cell handle the allocation of destination virtual disk 402 autonomously. This allocation involves creating data structures that map logical addresses to physical storage capacity, and in a particular implementation involve processes described in greater detail in U.S. patent application Ser. No. 10/040,194 entitled "SYSTEM AND METHOD FOR ATOMIZING STORAGE" which is assigned to the assignee of the present invention and incorporated herein by reference.

The actual allocation and copying of data may take several minutes to several hours in the case of storage of many gigabytes or terabytes. These processes can be streamlined by allocating and copying only logical storage blocks that are used in source virtual disk 401. For example, a virtual disk 401 may implement 1 terabyte of storage, but a sparsely populated example may use only a few gigabytes of capacity to store actual data. In accordance with the present invention, destination virtual disk 402 will reserve resources needed to implement the entire 1 terabyte, but will only allocate and copy the locations that are actually used to store data and may allocate the other locations. This greatly reduces the resources required to implement and maintain a replicate at the destination, and reduces the time required to create replicates.

A "copy set" is a set of member virtual disks where each member virtual disk is a replica of the others, and may comprise any number of replica virtual disks. While it may be easier to describe and understand the present invention by designating one virtual disk as a source or original virtual disk and the others as destinations or replicas, it is important to understand that once the copy set is created each member virtual disk is essentially a peer of all others. To create a copy set, the user designates a virtual disk as the source, and an alternate site storage cell (not a virtual disk) for the destination. The destination virtual disk does not exist prior to the copy set creation operation. Instead, it is created specifically to be a member of the copy set. Because each destination or alternative virtual disk is created on demand, it is created specifically and automatically to be compatible with the copy set. Hence, there are little or no manual procedures that must be performed to create new members for a copy set. This allows the copy set to increase (or decrease) its membership readily.

Figure 5:
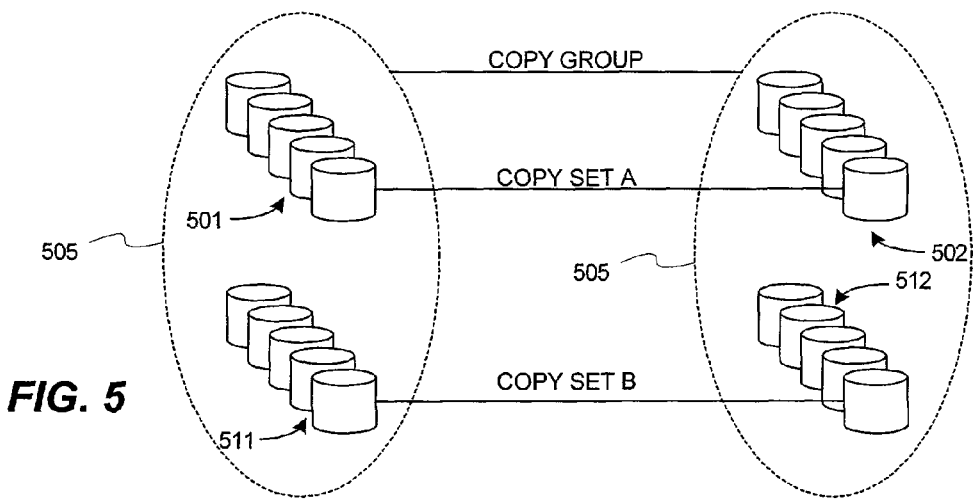
FIG. 5 illustrates logical relationships between data structures of the present invention.

In the preferred implementation, objects do not span sites or storage controllers. Instead, objects exist at each site and are associated with each other as suggested in FIG. 5. For instance, the controller 105 views a "DRM Group" 505 as a source group associated with a destination group (represented by a dashed-line oval in FIG. 5). The controller does not have a copy set object per se, rather group members (virtual disks) that are associated with remote members (virtual disks). The copy set is represented by this association. In FIG. 5, virtual disks 501 are associated with virtual disks 502 to form a copy set and virtual disks 511 are associated with virtual disks 512 to form another copy set.

DRM groups 505 comprises a set of related virtual disks or LUNs that belong to copy sets all of which have the same source and destination. Multiple groups 505 can exist for a given source and destination combination. While in one sense a group 505 spans sites, in practice a separate logical object that represents a group is implemented in each site (i.e., each controller 105 managing a group). Hence, in another sense each group 505 comprises a set of source halves of copy sets (i.e., the source LUNs 501 and 511), or destination halves of copy sets (i.e., destination LUNs 502 and 512). A group 505 is considered a "local group" by the controller 105 that implements the group logical object, and is considered a "remote group" when implemented by another controller 105. In other words, whether a group 505 is local or remote is determined from the perspective of a particular controller 105. A local group 105 is associated with a remote group 105 when the LUNs contained in each group are in the same copy set. In a multidirectional implementation, each local group 505 will be associated with a plurality of remote groups 105.

In essence, a group contains a collection of LUNS for which a combined I/O stream must be replicated in the LUNs of each remote group to provide certain properties with regard to its interruption (e.g. a copy set holding a database and a copy set holding a journal related to the database). DRM groups 505 are used for maintaining crash consistency and preserving WRITE ordering. Crash consistency refers operation in the event that a host 102 or link to a host 102 crashes during a data transaction. In such event, it is important that the data transaction be committed to all members of the group or fail in all members of the group. In a database/journal implementation, for example, it is important to prevent a situation in which the database is modified, but the journal does not reflect the modification, or vice versa. The consistency property applies when the group has more than one member. In general, more than one virtual disk should be added to a group only if the application requires it. In most cases, a group should comprise only one member for more optimal performance, in which cases the crash consistency behaviors are less important.

Virtual disks in a group should have the same alternate site. A group is limited to 32 virtual disks in a particular implementation. A virtual disk can belong to at most one group. Virtual disks in the same DRM group 505 may belong to different disk groups. When a group object is created on the primary site controller, the controller automatically creates a symmetric group object on the alternate site controller. A group is created during copy set creation, if the user chooses not to use an existing group.

At a site, all members of a group are accessed on the same controller in a dual pair to enforce cache coherency (i.e., not split between dual controllers). The preferred storage controller should be the same on all members. When members are added to a group, they are automatically moved to reside on the same controller, and thereafter will failover together. If the preferred storage controller is changed on one member, it will change the setting for all members. These constraints create a configuration in which all members in a group share the same connection/path between source and destination sites. Different groups may share the same connection/path to the same alternate site or a different one. If more than one member in a group needs to copy, then they are copied one at a time with a queue depth selected to keep the pipe full for optimal performance.

Figures 6, 7:
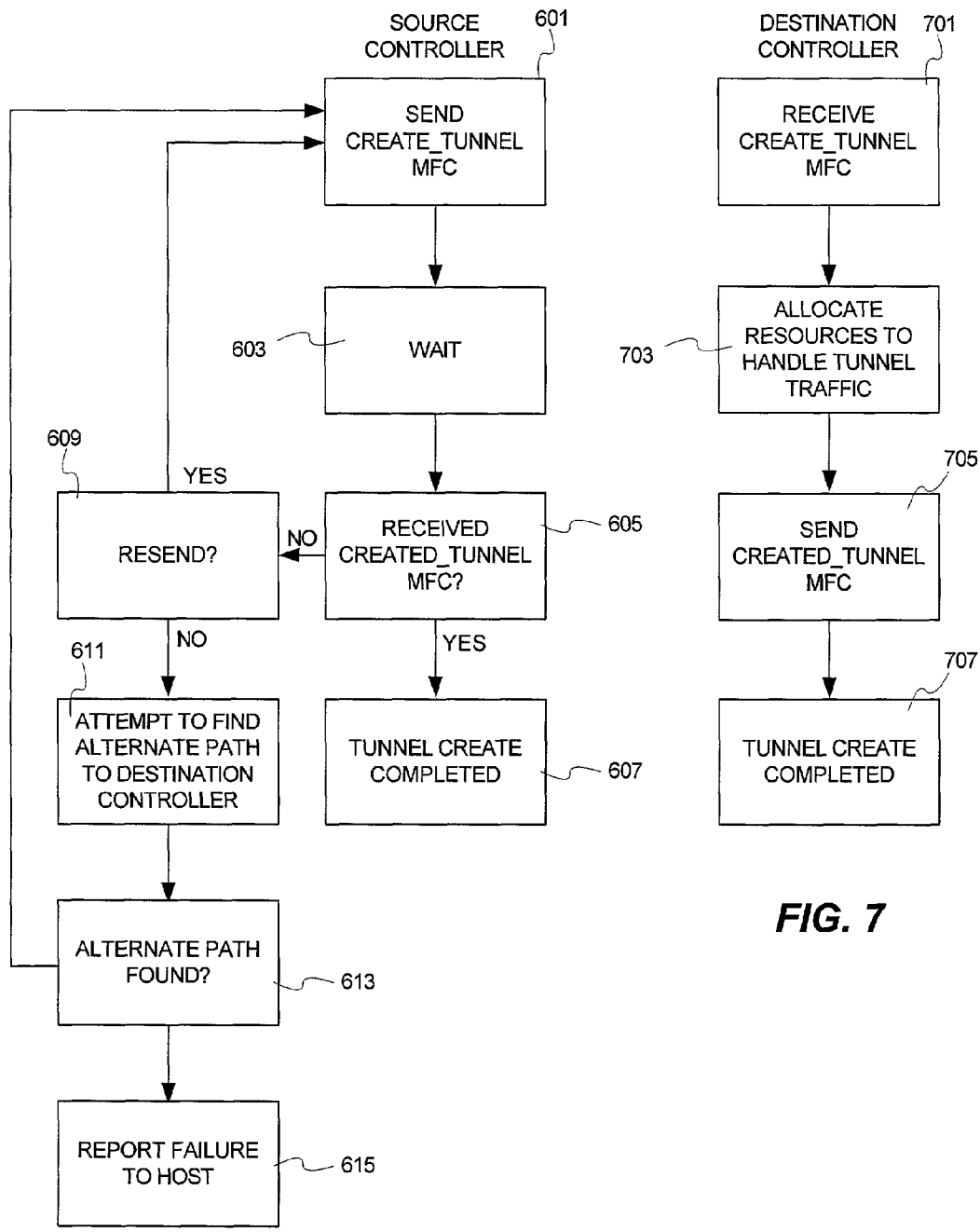
FIG. 6 and FIG. 7 convey in flow-diagram form actions performed to create a communication tunnel in accordance with the present invention.

FIG. 6 illustrates a more detailed flow diagram of the build tunnel operation 205 from the perspective of a source controller, whereas FIG. 7 shows corresponding processes from the perspective of a destination controller. In 601, the source controller allocates and initializes the required resources at its end and generates a CREATE_TUNNEL MFC message that is addressed to a controller 105 in the storage cell 101 specified by the host requesting group creation. The source controller can obtain parameters needed to communicate with any controller 105 in the SAN using fibre channel protocols. Each port that connects to fabric 103 has a fabric-unique address and switch 301 implements a name server that registers a worldwide name for each storage cell 101. By appropriate inquiries to the switch 301, any controller 105 can obtain sufficient information to communicate with any other controller 105. This information, which includes manufacturer, device type and version identification among other information, identifies controllers that support the protocol mechanisms of the present invention (referred to as "DRM capable controllers" herein). Preferably, the controllers 105 that implement the present invention are able to operate with non-DRM capable controllers, but only expect DRM capable controllers to accept and respond to MFC protocol messages Subsequent inquiries directed to DRM capable controllers can obtain information about the storage cells they manage beyond what can be obtained from switch 301 using the protocol in accordance with the present invention.

In preferred configurations, each storage cell 101 is coupled by redundant communication paths to each other storage cell 101. For example, redundant controllers, redundant ports on each controller, and redundant fabrics 301 enable some variety in the selection of paths. The source controller 105 is able is to select a particular path for a tunnel based on any criteria, such as load balancing, or may select from the available paths randomly or using a round-robin technique. Once a particular path is selected, the destination controller 101 will be determined.

In operation 701, the destination controller receives the CREATE_TUNNEL MFC, and begins the processes 703 of allocating resources (e.g., buffers, logical objects to handle communication, and the like) needed to handle tunnel traffic. During operations 703, the source controller waits in step 603. Once resources are successfully allocated, the destination controller issues a CREATED_TUNNEL MFC to the source controller in operation 705. In corresponding operation 605, the source controller receives the CREATED_TUNNEL MFC at which time the source controller and destination controller transition to a tunnel creation completed state 607 and 707 respectively.

For a number of reasons, the destination controller may be unable to create the tunnel. For example, the CREATE_TUNNEL MFC may be dropped before reaching the destination controller, the destination controller may be unable to allocate resources, or may fail to send the CREATED_TUNNEL MFC. In operation 605, when the source controller fails to receive the CREATED_TUNNEL MFC, the source controller determines whether to resend the CREATE_TUNNEL MFC in operation 609. If so, control passes back to operation 601. This decision may allow the source controller to attempt to create a tunnel a predetermined number of times before moving to operation 611 where an attempt is made to find an alternate path. Operation 611 may involve a path using a different port in either or both of the destination/source controllers, using a different fabric 103 or different ports on a switch 301, and/or using different controllers 101 for the destination. In an extensive effort, the source LUN could be moved to another controller 101 which might make even more alternate paths available, however it is preferable to find a path that does not require moving the source LUN. When an alternate path is selected in operation 613, control returns to operation 601. When an alternate path cannot be found, a message is generated to the requesting host indicated the failure to create a tunnel in operation 615.

Figure 8:
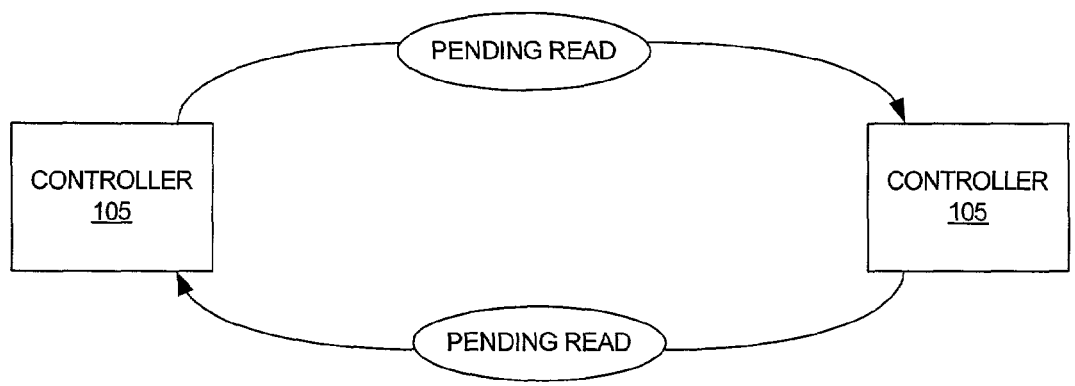
FIG. 8 illustrates operations involved in forming a communication tunnel in accordance with the present invention.

FIG. 8 illustrates operations involved in building a tunnel as described in step 205 shown in FIG. 2. Controllers 105 include memory in which I/O buffers can be allocated. A controller 105 that is initiating the tunnel creation allocates buffers for use by the tunnel. In a particular implementation, initial tunnel creation involves allocating four individual 2 KB buffers identified by a set of four consecutive Fiber Channel "Transaction IDs" (OX_ID) that are derived from a single ordinal referred to as the "tunnel index." The buffers are to be used in a circular fashion cycling through the OX_IDs in order. Message Function Calls (MFC) are aggregated into "message frames" with a header that contains protocol-related data. These frames are sent to the other controller using an OX_ID to identify where the data should be placed. With adequate hardware support, reception of the single data frame causes an interrupt that identifies exactly which buffer was written (OX_ID). When the frame is acknowledged by sending either a "message frame" (with highest received message frame Sequence Number piggy-backed in the protocol header) or a special Fiber Channel extended link service (ELS) frame to the other end, it is implied that this buffer as identified by the OX_ID is available for use again. When a tunnel is fully "open", both ends have message frame buffers allocated and initialized. Opening a tunnel essentially involves setting up the resources and identifying the tunnel index in use at each end.

The data transmission part of the protocol is based on initializing the hardware at one end for a set of standard Fiber Channel "exchanges" as though each "exchange" were a SCSI read of a particular size (such as 4 KB or 16 KB). The set of "exchanges" is referred to as a "bundle". Each "exchange" is identified by a specific OX_ID than can be derived from the "tunnel index" and knowing the specific "bundle" involved. Sending data to a particular resource within a bundle involves setting up the hardware at the sending end to send a sequence of one or more Fiber Channel frames (with increasing data offsets when multiple frames are required) to the destination Fiber Channel address using the appropriate OX_ID. Acknowledgment by the receiver that the data was successfully received implies that the resource is available for further use in other transactions. Negative acknowledgment by the receiver indicates that the hardware has been re-armed to receive the data previously sent which was not correctly received. Transmission of data within a tunnel usually involves a specific "bundle" so that commands can specify exactly which resources by using schemes as simple as bit arrays (or bit masks). The precise "bundle" is inferred by the command operation code itself. In one implementation, the basic "bundle" is the "Message Frame Bundle". Both ends must have this "bundle" allocated and initialized. Each end may independently "activate" a "Write Resource Bundle" and/or a "Copy Resource Bundle" for use by the other end and at its request.

Once a tunnel is established, each controller has pre-allocated I/O resources for handling command-response (MFCs) exchanges with the other controller. These pre-allocated resources will continue to exist for the life of the tunnel. Each end of the tunnel sends data of a kind corresponding to the "bundle" involved—as if a SCSI Read command had been received with an OX_ID that can be inferred from the "tunnel index" and the "bundle" and resource identified. In a sense, the end that is sending data behaves as if it was responding to a just-received SCSI Read command, although the protocol does not require a corresponding SCSI Read command and the commands that set up the resource on the receiving end were transmitted independently of the instant transaction to send data.

In the case of a "Message Frame", which comprises one or more messages in a single transport frames, the hardware is set up to cause an interrupt simply due to receiving the last (and only if 2 KB frames are supported) data frame (as determined by an end of sequence indicator in a frame header). In typical applications, the interrupt does not occur until a SCSI response frame is received. The particular implementation of the protocol does not use SCSI response frames, so the hardware must be capable of interrupting simply on reception of a "last" data frame.

In the "Message Frame" case, a single data frame containing one or more MFCs is processed subject to ordering rules. Once processed the hardware is set up to again respond "like a SCSI read" to the same OX_ID. The other end infers this when it receives acknowledgment for the given "Message Frame". It should be noted that the actual physical buffer used need not be the same. It is only required that the OX_ID identify some specific 2 KB buffer known to the receiving end.

Figure 9:
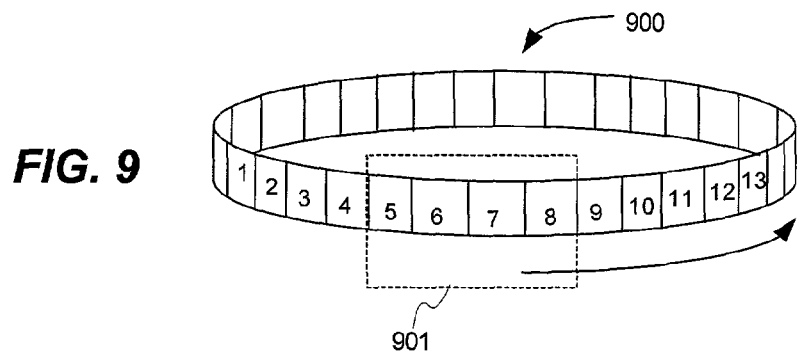
FIG. 9 shows a tunnel sequence in accordance with an implementation of the present invention.

FIG. 9 illustrates a conceptual arrangement of a tunnel sequencing methodology for each tunnel. As noted above, in a particular implementation each tunnel is defined by corresponding sets of 4 buffer locations on each side of the tunnel. Each buffer corresponds to one value in tunnel sequence 900. Tunnel sequence 900 is illustrated in a circular fashion to suggest that sequence numbers wrap around. When the largest tunnel sequence number is used, the sequence wraps around to the beginning such that the next available sequence number after 31 in the particular example is 1. The size of the tunnel sequence may be increased or decreased to meet the needs of a particular application.

At any given time, a subset of these locations (sequence numbers) is in use simultaneously, indicated by a window 901 in FIG. 9. The window size in a particular implementation is four, although this may be increased or decreased to meet the needs of a particular application. The window size can be fixed, or may be dynamically adjusted to regulate the effective bandwidth consumed by any given tunnel. Conditions that might prompt changing the window size would be congestion, dropped frame rate, the rate of dropped operations, or other criteria that might prioritize one tunnel over another. Each time a buffer location is used by a controller to communicate with another controller, the next available sequence number is assigned to that communication. Hence, window 901 slides around the sequence loop shown in FIG. 9 as transactions complete. A controller will not transmit a communication unless a tunnel sequence number can be assigned.

Hence, an operation associated with tunnel sequence number 9 cannot be issued until the operations using tunnel sequence number 5 is complete.

The actual buffers used for each "bundle" are known to the receiving end because the receiving end allocates them and associates them with specific OX_IDs. For "Message Frame Bundles", each OX_ID corresponds, in one implementation, to one 2 KB buffer. For "Write Resource Bundles", each OX_ID corresponds to a "Scatter-Gather List" (SGL) containing, in one implementation, 4 2 KB buffers. For "Copy Resource Bundles", each OX_ID corresponds to a "Scatter-Gather List" (SGL) containing, in one implementation, 64 2 KB buffers. The amount of data to be sent in a copy operation is fixed at 128 KB in a particular implementation, so a single "Copy Resource" is allocated for each operation.

The amount to be sent for a write operation varies from 1 sector (0.5 KB) to 256 sectors (128 KB) so between 1 and 16 "Write Resources" are allocated depending on the transfer size. A write operation or copy operation involves allocating the appropriate resources, causing the data to be sent, then sending a command that identifies where the data was sent and specifies the operation parameters. To minimize the number of command and response frames when the operation rate is high, command and response frames can be aggregated within "Message Frames." The "Message Frame" mechanism also provides guaranteed orderly delivery for commands and responses. Accordingly, the payload portion of each Fiber Channel "Message Frame" may contain multiple information units (IUs) 902, where each IU 902 corresponds to a particular command or data message and each IU 902 includes control information indicating, for example, LUN ID, block count, group sequence number (used to preserve order amongst operations), and/or data depending on the type of operation that is being conveyed.

Each IU 902 (or MFC as described above) contains a vector indicating a particular processes on the receiving end that is to handle the IU 902 as well any necessary control information such to indicate the beginning and ending of an IU. Aggregation is particularly useful in sending control information in which each IU 902 may comprise a relatively small number of bytes (e.g., acknowledge messages, negative acknowledge messages, command messages, and status messages) as compared to data transfer messages which typically fill the payload sections more completely.

FIG. 10 identifies operations used in a write operation after a data replication group has been created. The example of FIG. 11 involves a single source storage cell 101 having dual, mirroring controllers, and a single destination storage cell 101 having dual mirroring controllers. In a particular implementation, each controller includes 1 GB of cache for a total of 2 GB for the storage cell 101. The cache is divided into read and write data, where the write data is preserved by a battery and mirrored in the redundant controller. As this division is equal between read and write data, there is an effective read cache for the subsystem of 1 GB, and an effective write cache of 256 MB of mirrored cache. Various operations shown in FIG. 11 involve interactions with the mirrored cache and would be omitted if mirrored caching were not used in a particular application. Moreover, a particular implementation uses software mirroring, however, it is contemplated that hardware mirroring may be used and preferred in many applications.

In operation 1101, a write request specifying a particular LUN is received from a host 102 and validated. In a SCSI over fibre channel implementation (e.g., the SC-FS standard protocol), the command is received first, and validation may include various operations including verifying that the command is intact by verifying check sums or error detection codes, verifying that the command is directed to a LUN managed by that controller, or other error condition checks useful in a particular application. The controller 105 that receives the write request from a host 102 is the designated source controller for the received request. According to the SC-FS protocol, the source controller 105 acknowledges receipt of the valid command to host 102 and waits for the data associated with the operation to be sent in one or more FC frames from the host 102 to the source controller 105. A write operation may in fact involve a series or stream of related write operations. The write operations are presumed to be received by the source in proper order, and the data transfer protocol in accordance with the present invention operates to preserve the order in which the operations are received as the operations are applied to other members of the data replication group.

In a mirrored cache implementation, the cache is locked in operation 1103, then the data is completely copied to the mirror cache in operation 1105. After operation 1105, the write operation is securely recorded in two battery-backed caches. If an error prevents caching, error-handling mechanisms within controller 101 are called, the operation of which is beyond the scope of this disclosure. In a particular embodiment, the connection between redundant controllers 105, hence between mirror caches used in operation 1105, is through a fibre channel point-to-point connection that uses a message function call protocol that is similar to the protocol used, although the protocol used for mirrored caching does not traverse a fabric nor involve the need to create tunnels, among other differences.

In operation 1107, a group sequence number (GSN) is associated with the write operation. An important feature of the data transfer protocol in accordance with the present invention is that it enables a group to maintain write ordering among the members. To ensure write order preservation, a group sequence number (GSN) is associated with each write operation. Each write operation in a stream of operations has a unique GSN value that identifies the order in which that write operation was completely received in relation to all other write operations for that group. The set of GSNs for a stream of operations forms an unbroken, continuous sequence of values with no gaps. The GSN is stored atomically with the write operation so that a write operation will not be valid until a GSN is associated with the operation. A write operation is not assigned a GSN until a complete and properly formed record of the operation (e.g., LUN identification, logical block address, block count, and the like) is obtained, thereby ensuring that no gaps will exists in the group sequence. In a particular implementation, once a complete, properly formed write operation record is completely received, it is stored in non-volatile cache memory, and marked valid for access only after the GSN is stored with the write operation record in the non-volatile cache in operation 1109. After the write operation record is marked valid in 1109 it can be subsequently used to commit the write operation in 1111 to media-based storage against the source and destination members of the copy set.

In the software mirroring implementation, the GSN is written first to the mirror's cache, then transmitted from the mirror to the original controller's cache. In a hardware mirroring example, the GSN may be written to both caches substantially simultaneously in operation 1107. It is contemplated that operation 1107 may be conducted in parallel for a number of operations. For example, GSNs for a plurality of operations may be assigned and stored in the mirror cache before any of these GSNs are transmitted back to the original controller's cache. When transmitting the GSNs back to the original cache, multiple GSNs may be aggregated into a single message communicated between the mirror cache and the original cache.

In a particular implementation the GSN is a four-byte value that enables a large number of operations to be uniquely identified. The GSNs are assigned sequentially in a rigid order. Hence, if the most recent operation for this group had a GSN=0001, the current operation would be associated with a GSN=0002. In a stream of write operations, each operation is assigned a GSN in the order received. The group object maintains a record of the highest GSN that has been used. The cached data operation is marked valid in both caches in operation 1109. Significantly, the GSN is associated with the cached operation atomically in that the operation is not valid in cache (i.e., can not be obtained from cache to perform write operations) until the GSN is associated with the operation in non-volatile memory (e.g., battery backed cache).

In the event a member of the copy set cannot be reached to receive write and/or copy operations in operation 1111, a log is created to store all write transactions until the transaction can be committed to the unavailable member(s) a copy set. The log is created in non-volatile media-based storage such as in a LUN created to hold the log. The log contains the write operation records and the associated GSNs so that the log can be replayed to merge the pending writes, in order, to a destination when the member becomes available. When a group comprises multiple member LUNs, group members enter and exit logging at the same time, to assure order across the volumes.

The data transfer protocol layered on the present invention associates the group sequence number (GSN) with write and copy operations as they are transferred from site to site. The GSN is associated with write and copy operations in a strict, continuous order so that each site can independently process the commands in the same order in which they were completely received by the source controller. Also, the GSN allows controllers to determine whether a particular operation has been previously received and processed, which is very useful in operations that involve retransmission of operations. For example, the system may resend operations with GSNs due to failover or loss of connection. The receiving controller may discard operations that it has already received and processed, sending a SUCCESS status to the source controller. Although operations are normally transmitted and delivered in order, data frames may be dropped such that an operation is received that requires retransmission of data, and this operation may be bracketed by operations where the data is successfully received. In this case, ordering processes in the receiving end will delay processing of operations subsequent to the operation requiring transmission (i.e., having a higher GSN than the operation being retransmitted) until the retransmission succeeds.

In 1111, a DRM_WRITE operation is formed from the cached-store operation and sent to the destination LUN through the tunnel in fabric 301. The DRM_WRITE operation, like other protocol operations in accordance with the present invention, comprises information units (IUs) that include various fields that hold data and metadata related to the particular operation. A typical operation comprises one or more data IUs and a command IU 902 as described hereinbefore. A single data IU 902 may extend over several fibre channel frame transmissions. A typical operation also involves response messages, which may be aggregated into a single fibre channel frame.

Considering a write operation of 24 KB of data, the source controller 105 will assign a sufficient number of buffer locations (resources) to hold the write operation. The data transfer part of this operation will be spread out over 12 fibre channel frames, each of which will identify the OX_ID identifying a specific one of the 2 KB resources into which the frame should be stored. The operation is transmitted by sending the fibre channel frames addressed to the controller 105 on the other side of the data replication group's tunnel. Because the buffers on the receiving end are already allocated, and the exchange ID's known to the transmitting controller, the operation can be transmitted to the receiving end with little overhead and low latency. Moreover, in the case of command messages and metadata messages, multiple command operations can be aggregated into a single fibre channel frame, further reducing overhead and latency on a per-operation basis. This ability to aggregate operations applies generally to substantially all command and response operations.

Each message frame transmission includes a tunnel sequence number. The tunnel sequence number is part of the protocol header data transmitted. A given sequence number modulo the window size will correspond to a specific resource in the "Message Frame Bundle". Hence, the tunnel sequence number identifies which OX_ID to use, for the associated frame transmission.

As many data frames as required are sent, followed by the command message. Multiple command messages may be aggregated into one message frame. The controller at the receiving end processes the command out of the message frame bundle when it can be processed according to ordering rules. A separate structure is allocated to keep the operation parameters and context. The separate structure is indicated by a field in the MFC and is allocated at the source as part of tunnel "bundle" resource allocation. It is based on the highest index of the set of resources picked from the associated "bundle".

If the command and all the data reached the destination controller, the command is processed. The message frame is acknowledged after all the MFCs are processed. In certain cases such as duplicate transmission, the acknowledgment may be piggybacked on a message frame containing the response MFC. After the operation has been performed (some time later), a response MFC will be sent within another message frame.

A DRM_WRITE command IU 902 includes a command code or op-code indicating a write, an identification of the LUN to be written and the logical block address of the operation, as well as the data being written. Each operation also includes the GSN of that operation which is included in at least the command IU 902 for that operation. With this information, the receiving end implements processes for committing the write operations to media in-order. Hence, the tasks involved in maintaining in-order completion are distributed between the transmitting controller and the receiving controller, in contrast with prior designs that assigned responsibility of in-order completion to the transmitting controller.

The destination controller receives, mirrors, and acknowledges the write operation as shown in more detail in FIG. 11. The source controller waits to receive a confirmation in operation 1113 that the write operation was successful in the form of a DRM_WRITE_COMPLETE message from the destination controller. The destination controller may aggregate multiple DRM_WRITE_COMPLETE messages into a single fibre channel frame to improve efficiency. The original controller tells its mirror that the GSN-designated operation was successfully sent to destination and the original controller updates its own metadata to indicate that the GSN designated transfer sent to destination.

The present invention supports synchronous operations in which the host 102 that issued the write operation will be informed of completion of the write operation only after all writes to all member LUNs of the copy set return completed. In asynchronous operation, completion status may be sent to host as soon as the write operation is successfully stored in one or both caches and atomically associated with the GSN. When multiple replica sites are involved, it is contemplated that completion status may be sent to host 102 whenever the write is completed in a specified set of replicas (e.g., destinations 1,3,5 or destinations 2,5) to meet the needs of a particular application. It should also be noted that the operations described above deal primarily with capturing the write operation into the cache of the source and destination controllers, and that the processes associated with committing the write operations to media-based storage (e.g., hard disks) are handled separately and independently by the various controllers 105.

The source controller can send more DRM_WRITE operations as needed while awaiting the DRM_WRITE_COMPLETE message in operation 1113. Although the source controller can detect a failed DRM_WRITE operation by failure to receive a corresponding DRM_WRITE_COMPLETE message, other protocol mechanisms are provided to identify dropped write operations more quickly. For example, if the destination controller receives a heartbeat message (or message frame with tunnel sequence number) out of order, as identified by a gap or discontinuity in the tunnel sequence numbers, it can send a request to retransmit the message frames to the source controller.

FIG. 11 illustrates various operations related to processing a write request from the destination's perspective. A write operation is received in operation 1201 (from a source operation 1111). If the GSN is lower than the highest GSN already acknowledged, the data is discarded but a successful response is sent. If the GSN of the received write operation is otherwise out of sequence (probably due to a write command received where some of the data itself was dropped), the operation is held to await arrival of out of order commands with the missing GSNs. This ensures in-order completion of write operations. In 1203, the mirror cache in the destination controller 101 is locked, and in 1205 the write operation is completed in both the destination controller and the mirror controller. Again, use of software or hardware mirroring is contemplated and the cache is implemented as a non-volatile cache such as battery backed RAM. The group sequence number of the operation is recorded in operation 1207 so that the destination controller and its mirror reflect the highest GSN that has been received. In operation 1209 the destination sends a DRM_WRITE_COMPLETE message to the source.

It should be appreciated that the system and data transfer protocol in accordance with the present invention requires only one round trip between sending and receiving devices for a conventional data transfer. By way of comparison, SCSI over fibre channel protocol requires two round trips for every transfer. That is a significant performance benefit, and is critical with round the world distance latencies.

FIG. 12 illustrates operation of a heartbeat system in accordance with the present invention. The heartbeat system serves multiple purposes such as detecting failed controllers or transmission links, monitoring latency and/or quality of service between controllers, and to more quickly detect operations that are dropped in transmission. In an SAN environment, waiting for the arrival of a subsequent command frame can take a substantial amount of time. The protocol in accordance with the present invention includes "heartbeat" or "ping" messages that are transmitted at fixed frequency such as one per second. These heartbeat messages carry immediate data indicating the tunnel sequence number of the most recently transmitted operation. The heartbeat frames are preferably transmitted at regular intervals such as once per second from controllers at each end of a tunnel, and will result in an acknowledge response from the destination back to the source. The interval for sending heartbeat frames does not need to be fixed or regular, and may be adapted to balance overhead with performance by increasing the interval to reduce overhead or decreasing the interval to speed detection of dropped frames.

The round trip time for the heartbeat request/response exchange is monitored and used to define a time-out interval. The time-out interval can be defined as a moving average, or instantaneous round trip time, or may be a multiple of that value (e.g., 1.5×round trip time), or otherwise computed from the round trip time (e.g., round trip time+100 ms). When a controller does not receive either a heartbeat response message or a heartbeat message from the controller on the other side of a tunnel within the currently defined time-out interval, the tunnel is assumed to have collapsed or failed and is irrevocably closed. Before tunnel closure, retries are attempted. The period of time is adaptive based on the previous round-trip times recorded. The longer the round-trip time, the longer one must wait before closing a tunnel. This is adaptive to account for link/fabric congestion. An inactive tunnel may also be closed to free up controller resources. Hence, after a specified period of inactivity a tunnel may be automatically closed and the resources used by that tunnel freed.

In practice, a tunnel connecting a source controller 105 and a destination controller 105 may hold several outstanding write operations. Once each write operation's command frame has been transmitted, it will be eventually followed by a heartbeat message containing the tunnel sequence value for the operation's command frame. In this manner, the destination controller can detect a missing command frame very quickly after the command frame was sent, and does not need to wait for a subsequent command frame to arrive. A dropped data frame will be detected when the command frame is received. A dropped command frame will be detected when the heartbeat message is received.

When the heartbeat processes detect loss of connection with a destination and no alternate path can be established, the source controller logs data operations for which it is a source controller for one (or more) destination controller(s) that is (are) not accessible. The logged operations, which track operations in order of GSN, can be played back as soon as the destination is rediscovered. Each controller is periodically trying to discover destinations that are currently not connected using a polling mechanism. During this playback, if a destination controller receives an operation associated with a GSN that has already been processed, the receiving controller can discard the operation.

Although the invention has been described and illustrated with a certain degree of particularity, it is understood that the present disclosure has been made only by way of example. In particular, the present invention is described herein in a data replication application in which the invention has been implemented, but it should be appreciated that the mechanisms provide a general mechanism for efficient communication between network devices. The concept of creating a self-renewing tunnel for SCSI-based communications, for example, can be readily applied as an extension of the fibre channel SCSI protocol to enable low overhead, efficient communication of SCSI operations. Similarly, while the present invention is implemented in a system with virtualized storage, it is readily applicable to systems with non-virtualized storage. These modifications as well as other numerous changes in the combination and arrangement of parts can be resorted to by those skilled in the art without departing from the spirit and scope of the invention, as hereinafter claimed.

We claim:

1. A computer method of communicating command and response data between an originating device and a responding device over a network comprising:
   providing a plurality of buffer resources in the responding device; and
   enabling the originating device to allocate one or more of the buffer resources in the responding device to a data transaction;
   automatically deallocating one or more of the buffer resources upon completion of the data transaction; and
   aggregating a plurality of commands into a single buffer resource.

2. A computer method of communicating command and response data between an originating device and a responding device over a network comprising:
   providing a plurality of buffer resources in the responding device; and
   enabling the originating device to allocate one or more of the buffer resources in the responding device to a data transaction;
   automatically deallocating one or more of the buffer resources upon completion of the data transaction; and
   aggregating a plurality of responses into a single buffer resource.

* * * * *